United States Patent
Matsunobu et al.

(10) Patent No.: US 11,434,343 B2
(45) Date of Patent: Sep. 6, 2022

(54) METHOD OF MANUFACTURING RESIN POROUS BODY

(71) Applicant: TOYOTA JIDOSHA KABUSHIKI KAISHA, Toyota (JP)

(72) Inventors: Kohei Matsunobu, Toyota (JP); Akio Minakuchi, Okazaki (JP); Hiroshi Uyama, Suita (JP); Chiaki Yoshizawa, Suita (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/134,657

(22) Filed: Dec. 28, 2020

(65) Prior Publication Data
US 2021/0214516 A1 Jul. 15, 2021

(30) Foreign Application Priority Data
Jan. 14, 2020 (JP) ............... JP2020-003918

(51) Int. Cl.
*H01M 8/106* (2016.01)
*C08J 9/28* (2006.01)
(Continued)

(52) U.S. Cl.
CPC ........... *C08J 9/286* (2013.01); *C08J 2323/08* (2013.01); *C08J 2329/04* (2013.01); *C08K 2003/2227* (2013.01)

(58) Field of Classification Search
CPC .... C08J 9/286; C08J 2323/08; C08J 2329/04; C08J 2201/05; C08J 2329/02;
(Continued)

(56) References Cited

U.S. PATENT DOCUMENTS 3,450,650 A 6/1969 Murata
6,464,351 B1 * 10/2002 Landry-Coltrain ...... B41M 5/52
347/105
(Continued)

FOREIGN PATENT DOCUMENTS

CN 1894029 A 1/2007
JP 2006-338918 A 12/2006
(Continued)

OTHER PUBLICATIONS

U.S. Appl. No. 17/066,063, filed Oct. 8, 2020, Matsunobu et al.
U.S. Appl. No. 16/998,664, filed Aug. 20, 2020, Matsunobu et al.
U.S. Appl. No. 17/001,753, filed Aug. 25, 2020, Matsunobu et al.

*Primary Examiner* — Kara B Boyle
(74) *Attorney, Agent, or Firm* — Sughrue Mion, PLLC

(57) ABSTRACT

Provided is a method of producing a resin porous body using a water-insoluble polymer, the method being excellent in terms of simplicity and capable of suppressing formation of a skin layer. A method of producing a resin porous body disclosed herein includes the steps of: preparing a coating liquid in which a water-insoluble polymer is dissolved and insulating particles are dispersed in a mixed solvent containing a good solvent for the water-insoluble polymer and a poor solvent for the water-insoluble polymer; coating the coating liquid on a substrate; and removing the mixed solvent from the coated coating liquid by vaporization. The poor solvent has a boiling point higher than a boiling point of the good solvent. Pores are formed by removing the mixed solvent by vaporization to obtain a porous body.

6 Claims, 2 Drawing Sheets

(51) Int. Cl.
*C08K 3/20* (2006.01)
*C08K 3/22* (2006.01)

(58) Field of Classification Search
CPC ... C08J 9/0066; C08J 9/28; C08K 2003/2227;
C08K 3/22; H01M 50/403; H01M
50/417; H01M 50/434; H01M 50/446;
H01M 50/46; Y02E 60/10; B01J 20/262;
B01J 20/28045; B01J 20/28054; B01J
20/3064; B01J 20/261; B05D 7/24; B05D
3/007; C08L 23/0861
See application file for complete search history.

(56) References Cited

U.S. PATENT DOCUMENTS

| | | | |
|---|---|---|---|
| 2002/0028320 A1* | 3/2002 | Iwasa | B41M 5/508 |
| | | | 428/32.18 |
| 2005/0020699 A1* | 1/2005 | Isobe | C01G 1/02 |
| | | | 516/33 |
| 2007/0128424 A1 | 6/2007 | Omori et al. | |
| 2010/0178544 A1* | 7/2010 | Nishikawa | H01M 50/414 |
| | | | 429/129 |
| 2013/0273421 A1* | 10/2013 | Matsumura | H01M 10/4235 |
| | | | 429/246 |
| 2019/0367699 A1 | 12/2019 | Minakuchi et al. | |

FOREIGN PATENT DOCUMENTS

| | | |
|---|---|---|
| JP | 2011-236292 A | 11/2011 |
| JP | 2019-206667 A | 12/2019 |

* cited by examiner

METHOD OF MANUFACTURING RESIN POROUS BODY

BACKGROUND OF THE INVENTION

1. Field of the Invention

The present disclosure relates to a method of producing a resin porous body. The present application claims priority to Japanese Patent Application No. 2020-3918, filed on Jan. 14, 2020, the entire contents of which are incorporated herein by reference.

2. Description of the Related Art

Porous bodies using water-insoluble polymers can exhibit a variety of characteristics, such as lightness, shock-absorbing properties, thermal insulation properties, sound absorption properties, separation properties and adsorption properties. Therefore, porous bodies using water-insoluble polymers have been used in a wide variety of applications, such as packing materials, construction materials, sound-absorbing materials, cleaning articles, cosmetic products, separation membranes, adsorbent materials, carriers for purification, catalyst carriers and culture carriers.

From perspectives such as production costs, it is desired for a method of producing a porous body using a water-insoluble polymer to be simple. As a method capable of producing a porous body of poly(vinylidene fluoride), which is a water-insoluble polymer, in a simple manner, Japanese Patent Application Publication No. 2011-236292 discloses a method of producing a porous body of poly(vinylidene fluoride), which includes preparing a solution by dissolving poly(vinylidene fluoride) in a mixed solvent of a good solvent for the poly(vinylidene fluoride) and a poor solvent for the poly(vinylidene fluoride) while heating, cooling the solution to obtain a molded body, immersing the molded body in another solvent to replace the mixed solvent with the other solvent, and then removing the other solvent by drying.

SUMMARY OF THE INVENTION

As a result of diligent research, the inventors of the present disclosure have found that the production method of the prior art had further room for improvement in terms of producing a resin porous body in a simple manner. In addition, the inventors of the present disclosure have found that a skin layer (skinning layer) having no pores was easily formed on the surface of the resin porous body. In cases where a skin layer is present on the resin porous body, a fluid cannot infiltrate into the porous body, which leads to drawbacks such as applications of the resin porous body being limited.

Therefore, an object of the present disclosure is to provide a method of producing a resin porous body using a water-insoluble polymer, the method being excellent in terms of simplicity and capable of suppressing formation of a skin layer.

A method of producing a resin porous body disclosed herein includes steps of preparing a coating liquid in which a water-insoluble polymer is dissolved and insulating particles are dispersed in a mixed solvent containing a good solvent for the water-insoluble polymer and a poor solvent for the water-insoluble polymer; coating the coating liquid on a substrate; and removing the mixed solvent from the coated coating liquid by vaporization. The poor solvent has a boiling point higher than a boiling point of the good solvent. Pores are formed by removing the mixed solvent by vaporization to obtain a porous body.

Provided by such a configuration is a method of producing a resin porous body using a water-insoluble polymer, the method being excellent in terms of simplicity and capable of suppressing formation of a skin layer.

DESCRIPTION OF THE PREFERRED EMBODIMENTS

Figure 1:
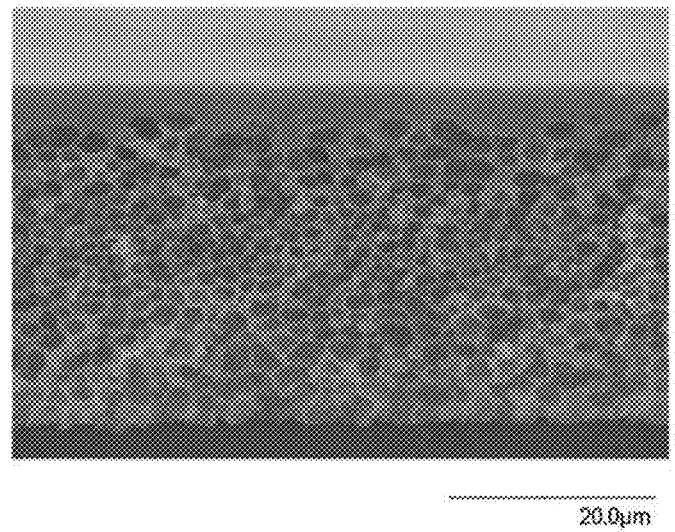
FIG. 1 is an SEM photograph of the cross section of the thin film obtained in Comparative Example 1.

The method of producing a resin porous body of the present disclosure includes steps of: preparing a coating liquid in which a water-insoluble polymer is dissolved and insulating particles are dispersed in a mixed solvent containing a good solvent for the water-insoluble polymer and a poor solvent for the water-insoluble polymer (hereinafter, also referred to as a "coating liquid preparation step"), coating the coating liquid on a substrate (hereinafter, also referred to as a "coating liquid coating step"), and removing the mixed solvent from the coated coating liquid by vaporization (hereinafter, also referred to as a "mixed solvent removal step"). Here, poor solvent has a boiling point higher than a boiling point of the good solvent. Pores are formed by removing the mixed solvent by vaporization to obtain a porous body.

First, an explanation will be given of the coating liquid preparation step. In the present disclosure, the "good solvent for the water-insoluble polymer" is a solvent in which the solubility of the water-insoluble polymer at 25° C. is 1 mass % or more. The solubility of the water-insoluble polymer in the good solvent at 25° C. is desirably 2.5 mass % or more, more desirably 5 mass % or more, further desirably 7.5 mass % or more, and most desirably 10 mass % or more. It should be noted that the type of good solvent to be used in the present disclosure is selected, as appropriate, according to the type of water-insoluble polymer. It is possible to use a single good solvent in isolation or a mixed solvent obtained by mixing two or more types of solvents.

In the present disclosure, the "poor solvent for the water-insoluble polymer" is a solvent in which the solubility of the water-insoluble polymer at 25° C. is less than 1 mass %. The solubility of the water-insoluble polymer in the poor solvent at 25° C. is desirably 0.5 mass % or less, more desirably 0.2 mass % or less, further desirably 0.1 mass % or less, and most desirably 0.05 mass % or less. The type of poor solvent to be used in the present disclosure is selected, as appropriate, according to the type of water-insoluble polymer. It is possible to use a single poor solvent in isolation or a mixed solvent obtained by mixing two or more types of solvents.

It is possible to use a Hansen solubility parameter (HSP) in order to assess whether a specific solvent is a good solvent or a poor solvent for a specific polymer compound. For example, if the dispersion term, polarity term and hydrogen bonding term of the HSP of the polymer compound are denoted by $\delta_{D1}$, $\delta_{P1}$ and $\delta_{H1}$ respectively and the dispersion term, polarity term and hydrogen bonding term of the HSP of the solvent are denoted by $\delta_{D2}$, $\delta_{P2}$ and $\delta_{H2}$ respectively, the solubility of the polymer compound tends to increase as the distance Ra (MPa$^{1/2}$) between the HSPs of the polymer compound and that of the solvent, as represented by the formula below, decreases.

$$Ra^2 = 4(\delta_{D1}-\delta_{D2})^2 + (\delta_{P1}-\delta_{P2})^2 + (\delta_{H1}-\delta_{H2})^2$$

In addition, if the interaction radius of the specific polymer compound is denoted by $R_0$, it is predicted that the polymer compound will be soluble if the ratio $Ra/R_0$ is less than 1, partially soluble if the ratio $Ra/R_0$ is 1, and insoluble if the ratio $Ra/R_0$ is greater than 1.

Alternatively, it is possible to assess easily whether a specific solvent is a good solvent or a poor solvent for a specific polymer compound by carrying out a test involving mixing the polymer compound and the solvent in a sample bottle or the like.

The good solvent and the poor solvent are mixed and used as a homogeneous solvent. Therefore, the good solvent and the poor solvent are compatible with each other. In the present disclosure, the boiling point of the poor solvent being used is higher than the boiling point of the good solvent being used. From the perspective of enabling a homogeneous porous body having a relatively high porosity to be obtained easily, the boiling point of the poor solvent is desirably at least 10° C. higher, and more desirably at least 90° C. higher, than the boiling point of the good solvent. From the perspective of drying speed, the boiling point of the poor solvent is desirably lower than 300° C.

In the present disclosure, the term "water-insoluble polymer" means a polymer that has a solubility in water of less than 1 mass % at 25° C. The solubility of the water-insoluble polymer in water at 25° C. is desirably 0.5 mass % or less, more desirably 0.2 mass % or less, and further desirably 0.1 mass % or less.

The "water-insoluble polymer" used in the coating liquid preparation step is the same as the water-insoluble polymer that constitutes the porous molded body. A polymer for which a good solvent and a poor solvent exist is used as the water-insoluble polymer. The type of water-insoluble polymer to be used is not particularly limited as long as a good solvent and a poor solvent for the polymer exist. Examples of water-insoluble polymers include olefin-based resins such as polyethylene and polypropylene; fluorine-based resins such as poly(vinyl fluoride) and poly(vinylidene fluoride); (meth)acrylic-based resins such as poly(methyl (meth)acrylate) and poly(ethyl (meth)acrylate); styrene-based resins such as polystyrene, styrene-acrylonitrile copolymers and acrylonitrile-butadiene-styrene copolymers; water-insoluble cellulose derivatives such as ethyl cellulose, cellulose acetate and cellulose propionate; vinyl chloride-based resins such as poly(vinyl chloride) and ethylene-vinyl chloride copolymers; and ethylene-vinyl alcohol copolymers. It is possible to use a polymer that has been rendered water-insoluble through modification of a water-soluble polymer. Of these, the water-insoluble polymer is desirably an aliphatic polymer compound (that is, a polymer compound having no aromatic ring) from the perspectives of usability of a porous body of the water-insoluble polymer and usability of a simple method of producing same. From the perspective of enabling a homogeneous porous body having a relatively high porosity to be obtained easily, the water-insoluble polymer is desirably an addition polymerization type polymer compound (that is, a polymer compound produced by polymerization of an ethylenically unsaturated double bond in a monomer having the ethylenically unsaturated double bond; for example, a vinyl-based polymer or vinylidene-based polymer). The water-insoluble polymer is desirably an ethylene-vinyl alcohol copolymer from the perspectives of usability of a porous body having a three-dimensional network type porous structure and usability of a simple method of producing same.

The average degree of polymerization of the water-insoluble polymer is not particularly limited, but is desirably not less than 70 but not more than 500,000, and more desirably not less than 100 but not more than 200,000. It should be noted that the average degree of polymerization of the water-insoluble polymer can be determined using a publicly known method (for example, NMR measurements or the like).

Suitable good solvents and suitable poor solvents will now be explained in more detail mentioning specific water-insoluble polymers as examples. The production method of the present disclosure can be advantageously carried out by using the good solvents and poor solvents explained below with the water-insoluble polymers given below.

1. Case where Water-Insoluble Polymer is Ethylene-Vinyl Alcohol Copolymer

An ethylene-vinyl alcohol copolymer (EVOH) is a copolymer containing ethylene units and vinyl alcohol units as monomer units. The content of ethylene units in the EVOH is not particularly limited, but is desirably 10 mol % or more, more desirably 15 mol % or more, further desirably 20 mol % or more, and particularly desirably 25 mol % or more. On the other hand, the content of ethylene units in the EVOH is desirably 60 mol % or less, more desirably 50 mol % or less, and further desirably 45 mol % or less. The degree of saponification of the EVOH is not particularly limited, but is desirably 80 mol % or more, more desirably 90 mol % or more, and further desirably 95 mol % or more. The upper limit for the degree of saponification is determined by technical limitations relating to saponification and is, for example, 99.99 mol %. It should be noted that the content of ethylene units and the degree of saponification in the EVOH can be determined using a publicly known method (for example, $^1$H-NMR measurements or the like).

In addition, EVOHs are generally produced by saponifying copolymers of ethylene and vinyl esters using an alkali catalyst or the like. As a result, EVOHs can contain vinyl ester units. Vinyl esters in such units are typically vinyl acetate, and may also be vinyl formate, vinyl propionate, vinyl valerate, vinyl caprate, vinyl laurate, and the like. In addition to ethylene units, vinyl alcohol units and vinyl ester units, the EVOH may also contain other monomer units as long as the advantageous effect of the present disclosure is not significantly impaired.

Examples of suitable good solvents for the EVOH include dimethyl sulfoxide (DMSO) and mixed solvents of water and alcohols. The alcohol used in the mixed solvent is desirably propyl alcohol. The propyl alcohol may be n-propyl alcohol or isopropyl alcohol. Therefore, a particularly suitable good solvent is DMSO or a mixed solvent of water and propyl alcohol.

Examples of suitable poor solvents for the EVOH include water; alcohols; cyclic esters such as γ-butyrolactone; cyclic carbonates such as propylene carbonate; cyclic sulfones such as sulfolane; ether group-containing monools such as propylene glycol monomethyl ether, propylene glycol monoethyl ether, diethylene glycol monomethyl ether, diethylene glycol monoethyl ether and 2-ethoxyethanol; and diols such as 1,3-butane diol, 1,4-butane diol, 1,5-pentane diol and 1,6-hexane diol. Of these, cyclic esters, cyclic carbonates, cyclic sulfones and ether group-containing monools are desired, γ-butyrolactone, propylene carbonate, sulfolane and ether group-containing monools are more desired, and γ-butyrolactone and sulfolane are further desired. The solubility parameter (Hildebrand SP value) δ of the poor solvent is desirably at least 1.6 $MPa^{1/2}$ higher than the solubility parameter δ of the EVOH.

It should be noted that in the case of EVOH, water and alcohols are poor solvents for EVOH, but a mixed solvent of water and an alcohol (particularly, propyl alcohol) is a good solvent. Here, the mixed solvent of water and an alcohol can be regarded as a mixed solvent of: a mixed solvent of water and an alcohol, which is a good solvent having a reduced amount of water; and water which is a poor solvent having a higher boiling point than the mixed solvent, and it is therefore possible to use only a mixed solvent of water and an alcohol in the preparation of an EVOH solution. Therefore, in the present disclosure, in cases where a solvent obtained by mixing two or more types of poor solvent for a specific water-insoluble polymer becomes a good solvent, it is possible to use singularly this mixed solvent including two or more types of poor solvent as the mixed solvent containing a good solvent for the water-insoluble polymer and a poor solvent for the water-insoluble polymer in order to prepare a solution.

2. Case where Water-Insoluble Polymer is Cellulose Acetate

Examples of suitable good solvents for cellulose acetate include nitrogen-containing polar solvents (particularly, nitrogen-containing aprotic polar solvents) such as N,N-dimethylformamide, N,N-dimethylacetamide and N-methylpyrrolidone; esters such as methyl formate and methyl acetate; ketones such as acetone and cyclohexanone; cyclic ethers such as tetrahydrofuran, dioxane and dioxolane; glycol derivatives such as methyl glycol and methyl glycol acetate; halogenated hydrocarbons such as methylene chloride, chloroform and tetrachloroethane; cyclic carbonates such as propylene carbonate; and sulfur-containing polar solvents (particularly, sulfur-containing aprotic polar solvents) such as DMSO. Of these, a sulfur-containing aprotic polar solvent is desired, and DMSO is more desired.

Examples of suitable poor solvents for cellulose acetate include alcohols such as 1-hexanol, 1,3-butane diol, 1,4-butane diol, 1,5-pentane diol and 1,6-hexane diol. A monohydric or dihydric alcohol having 4 to 6 carbon atoms is desired as the alcohol.

3. Case where Water-Insoluble Polymer is Poly(Vinylidene Fluoride)

Examples of suitable good solvents for poly(vinylidene fluoride) include nitrogen-containing polar solvents (particularly, nitrogen-containing aprotic polar solvents) such as N,N-dimethylformamide, N,N-dimethylacetamide and N-methylpyrrolidone; and sulfur-containing polar solvents (particularly, sulfur-containing aprotic polar solvents) such as DMSO. Of these, a nitrogen-containing aprotic polar solvent is desired, and N,N-dimethylformamide is more desired.

Examples of suitable poor solvents for poly(vinylidene fluoride) include alcohols such as 1-hexanol, 1,3-butane diol, 1,4-butane diol, 1,5-pentane diol, 1,6-hexane diol and glycerin; and cyclic ethers such as tetrahydrofuran, dioxane and dioxolane. Of these, alcohols are desired and dihydric or trihydric alcohol having 3 to 6 carbon atoms is desired as the alcohol.

The usage quantities of the water-insoluble polymer, the good solvent and the poor solvent should be selected, as appropriate, according to the types thereof being used. The mixing amount of the water-insoluble polymer is desirably 1 part by mass or more, more desirably 5 parts by mass or more, and further desirably 10 parts by mass or more, relative to 100 parts by mass of the good solvent. On the other hand, the mixing amount of the water-insoluble polymer is desirably 40 parts by mass or less, more desirably 35 parts by mass or less, and further desirably 30 parts by mass or less, relative to 100 parts by mass of the good solvent. The mixing amount of the poor solvent is desirably 10 parts by mass or more, more desirably 20 parts by mass or more, and further desirably 30 parts by mass or more, relative to 100 parts by mass of the good solvent. On the other hand, the mixing amount of the poor solvent is desirably 400 parts by mass or less, more desirably 200 parts by mass or less, and further desirably 100 parts by mass or less, relative to 100 parts by mass of the good solvent. By altering these amounts, it is possible to control the state of pores (for example, porosity, pore diameter, and the like) in an obtained porous body.

Insulating particles are dispersed in a mixed solvent without dissolving in a mixed solvent. Any one of inorganic particles, organic particles and organic-inorganic composite particles can be used as the insulating particles. Examples of organic materials that constitute the organic particles include polyolefins, (meth)acrylic resins, polystyrene, polyimides, phenol resins and melamine resins. Examples of the inorganic material that constitutes the inorganic particles include inorganic oxides such as alumina ($Al_2O_3$), magnesia (MgO), silica ($SiO_2$) and titania ($TiO_2$); nitrides such as aluminum nitride and silicon nitride; metal hydroxides such as calcium hydroxide, magnesium hydroxide and aluminum hydroxide; clay minerals such as mica, talc, boehmite, zeolites, apatite and kaolin; and glass fibers. Examples of organic-inorganic composite particles include particles obtained by coating the above-mentioned inorganic particles with the above-mentioned organic material. As the insulating particles, alumina particles and boehmite particles are desirable because of their high dispersibility in the coating liquid.

The shape of the insulating particles is not particularly limited, and may be spherical, plate-like, scale-like, needle-like, cube-like, amorphous, or the like. The degree of the effect of suppressing the formation of the skin layer may vary depending on the shape of the insulating particles. The shape of the insulating particles affects the porosity of the resulting resin porous body. The larger the aspect ratio of the insulating particles (i.e., the ratio of the major axis to the minor axis) is, the porosity tends to increase. Therefore, since a resin porous body having a high porosity can be obtained, the aspect ratio of the insulating particles is desirably 10 or more, and more desirably 20 or more. The upper limit of the aspect ratio of the insulating particles is not particularly limited. The aspect ratio of the insulating particles is, for example, 40 or less. It should be noted that the aspect ratio of the insulating particles can be determined by obtaining an electron microscope image of the insulating particles, calculating the ratio of the major axis to the minor axis for 20 or more particles arbitrarily selected in the image, and taking an average thereof.

The average particle diameter of the insulating particles is not particularly limited. When the average particle diameter of the insulating particles is small, the effect of suppressing the formation of the skin layer tends to be small. Therefore, the average particle diameter of the insulating particles is desirably 0.5 μm or more, more desirably 0.7 μm or more, still more desirably 2 μm or more, and most desirably 3 μm or more. On the other hand, when the average particle diameter of the insulating particles is large, the particles tend to settle easily in the coating solution, and thus the dispersion stability tends to be lowered. Therefore, the average particle diameter of the insulating particles is desirably 15 μm or less, more desirably 10 μm or less, still more desirably 7 µm or less, and most desirably 6 µm or less. It should be noted that in this specification, the "average particle diameter" refers to a particle diameter (D50; also referred to as a median diameter and a center particle diameter) having a cumulative frequency of 50% by volume in the particle size distribution measured by the laser diffraction/scattering method.

The content of the insulating particles in the coating liquid is not particularly limited. When the content of the insulating particles is small, the effect of suppressing the formation of the skin layer tends to be small. Therefore, the content of the insulating particles in the coating liquid is desirably 50 parts by mass or more, more desirably 100 parts by mass or more, still more desirably 200 parts by mass or more, and most desirably 400 parts by mass or more, relative to 100 parts by mass of the water-insoluble polymer. On the other hand, when the content of the insulating particles increases, the dispersion stability in the coating solution tends to decrease. In addition, when the content of the insulating particles increases, cracks tend to occur in the obtained porous film. Therefore, the content of the insulating particles in the coating liquid is desirably 700 parts by mass or less, more desirably 600 parts by mass or less, relative to 100 parts by mass of the water-insoluble polymer.

In order to obtain a high effect of suppressing the formation of a skin layer when the average particle diameter of the insulating particles is small, it is desirable to increase the blending amount of the insulating particles. In order to obtain a high effect of suppressing the formation of the skin layer when the content of the insulating particles is small, it is desirable to allow the average particle diameter of the insulating particles to be large. In light of the particularly high effect of suppressing the formation of the skin layer, when the average particle diameter of the insulating particles is A (µm) and the content of the insulating particles with respect to 100 parts by mass of the water-insoluble polymer in the coating solution is B parts by mass, the value of the product of A and B (i.e., A×B) is desirably 200 or more, and more desirably 300 or more.

The coating liquid may further contain components other than those described above within a range not significantly impairing the effect of the present disclosure.

The method for preparing the coating liquid is not particularly limited. The water-insoluble polymer, the good solvent, the poor solvent, and the insulating particles may be mixed using a stirrer to dissolve the water-insoluble polymer and disperse the insulating particles.

In a desirable method for preparing a coating liquid, first, a solution in which a water-insoluble polymer is dissolved in a mixed solvent of a good solvent and a poor solvent is prepared according to a known method. For preparing this solution, it is possible to dissolve a water-insoluble polymer in a good solvent, then add a poor solvent and then mix until a homogeneous solution is obtained, or add a water-insoluble polymer to a mixed solvent of a good solvent and a poor solvent and dissolve the water-insoluble polymer in the mixed solvent. This solution can be prepared using a publicly known stirring device, mixing device, or the like. When preparing this solution, it is possible to irradiate with ultrasonic waves, carry out heating, or the like. The heating temperature is, for example, not less than 40° C. but not more than 100° C. It is possible to prepare the solution of the water-insoluble polymer by heating, and then cool the solution in such a way that the good solvent and the poor solvent do not separate. In addition, this cooling is desirably carried out so that the water-insoluble polymer does not precipitate. This is because precipitated water-insoluble polymer can be an impurity.

The coating liquid is then prepared by dispersing the insulating particles in the solvent according to known methods. Specifically, for example, a coating liquid is prepared by performing mixing and dispersion of a solution of a water-insoluble polymer and insulating particles using a known dispersion device (for example, a homogenizer, a homodisper, a planetary mixer, an ultrasonic disperser, a pigment disperser, a ball mill, or the like).

Next, an explanation will now be given of the coating liquid coating step. The substrate used in the coating liquid coating step is not particularly limited as long as this can function as a substrate. A substrate that is resistant to the solvents contained in the coating liquid is typically used as the substrate.

The substrate may be one that is eventually detached from the porous body for use of the porous body, or one that is not detached from the porous body during use of the porous body. The shape of the substrate is not particularly limited, but a substrate having a flat surface is desired. Examples of shapes include sheet-shaped, film-shaped, foil-shaped and plate-shaped. Examples of constituent materials of the substrate include resins, glasses and metals.

Examples of the resins include poly(ethylene terephthalate)(PET), poly(ethylene naphthalate)(PEN), polyethylene (PE), polypropylene (PP), polystyrene, poly(vinyl chloride), poly(meth)acrylates, polycarbonates, polyimides, polyamides and polyamideimides.

Examples of the metals include aluminum, copper, nickel and stainless steel.

In addition, a material obtained by using a plurality of materials, for example, a fiber-reinforced resin such as a glass fiber-reinforced epoxy resin, can be used as the substrate.

In addition, the substrate may have a multilayer structure. For example, the substrate may have a release layer that contains a fluororesin. For example, the substrate may be a paper or the like having a resin layer.

In cases where the porous body is used without detaching the substrate, the substrate may function as a functional layer of the porous body. For example, the substrate may function as a reinforcing material, a supporting material, or the like. In addition, the substrate may be an electrode of a secondary battery, or the like (particularly, an active material layer of an electrode of a secondary battery). At this time, the method of manufacturing the resin porous body can be a method of manufacturing the electrode-integrated separator of the secondary battery.

The coating method is not particularly limited, and may be selected, as appropriate, according to the type of substrate. Examples of coating methods include die coating methods, gravure coating methods, roll coating methods, spin coating methods, dip coating methods, bar coating methods, blade coating methods, spray coating methods and casting methods. The coating thickness is not particularly limited and may be set, as appropriate, according to the intended use of the porous body, and is, for example, not less than 1 µm but not more than 500 µm, and desirably not less than 10 µm but not more than 300 µm.

By carrying out the coating liquid coating step, a coating film of the coating liquid is formed on the substrate. It should be noted that for the purpose of adjusting the viscosity of the coating film or the like, preliminary drying may be performed within a range in which a good solvent and a poor solvent contained in the coating liquid remain.

Next, an explanation will be given of the mixed solvent removal step. In the mixed solvent removal step, the good solvent and the poor solvent are removed by vaporization (volatilization in particular). In this mixed solvent removal step, a porous skeleton of a water-insoluble polymer is formed. In this mixed solvent removal step, pores are formed by an operation of removing a mixed solvent, specifically, by vaporization of a poor solvent to obtain a resin porous body. Typically, pores are formed by, for example, phase separation between the water-insoluble polymer and the mixed solvent in which the poor solvent has become highly concentrated. Specifically, because the poor solvent has a higher boiling point than the good solvent, the good solvent is preferentially vaporized ahead of the poor solvent in this step. As the amount of good solvent decreases, the concentration of the poor solvent in the mixed solvent increases. Because the solubility of the water-insoluble polymer in the poor solvent is lower than in the good solvent, phase separation occurs between the water-insoluble polymer and the mixed solvent in which the poor solvent has become highly concentrated, and a porous skeleton of the water-insoluble polymer is formed. This phase separation may be spinodal decomposition. Finally, the good solvent is removed, the water-insoluble polymer is precipitated, the poor solvent with the high boiling point is removed through vaporization, and pores are produced. A porous body of the water-insoluble polymer is produced in this way. It should be noted that in order to cause phase separation between the water-insoluble polymer and the mixed solvent in which the poor solvent has become highly concentrated, the type and usage quantity of the good solvent and the type and usage quantity of the poor solvent may be appropriately selected.

The method for vaporizing the mixed solvent of the good solvent and the poor solvent is not particularly limited, and examples thereof include methods involving heating, methods involving leaving in a vacuum, methods involving heating under reduced pressure and methods involving air drying. These methods can be carried out in the same way as publicly known drying methods. From the perspective of ease of carrying out the procedure, a method involving heating is desired. The heating temperature is not particularly limited, but is desirably a temperature at which the mixed solvent does not boil and the water-insoluble polymer and the poor solvent do not decompose. Specifically, the heating temperature is, for example, 25° C. or higher, desirably 50° C. or higher, and more desirably 70° C. or higher. On the other hand, the heating temperature is, for example, 180° C. or lower, desirably 150° C. or lower, and more desirably 125° C. or lower. The heating time should be decided, as appropriate, according to the type of solvent and the heating temperature. While vaporizing the good solvent and the poor solvent, it is desirable to leave the coating liquid of the water-insoluble polymer to stand.

Here, in the mixed solvent removal step, since the surface of the coating film of the coating liquid is exposed, this surface becomes a dry interface. When the coating liquid does not contain insulating particles, in the surface layer portion of the coating film of the coating liquid, the vaporization rate of the coating liquid increases as compared with the inside of the coating film, and thus, a deviation occurs in the composition between the surface layer portion and the inside of the coating film of the coating liquid. As a result, porosification does not occur in the surface layer portion of the coating film, and a skin layer is formed. However, in the present disclosure, the coating liquid contains insulating particles, and the insulating particles suppress the occurrence of compositional deviation between the surface layer portion and the inside of the coating film. As a result, porosification also occurs in the surface layer portion of the coating film, and formation of the skin layer is suppressed. The suppression effect of the occurrence of this composition deviation is considered to be caused by the change in moving speed of the good solvent in the coating film due to the interaction between the insulating particles and the good solvent, and the consequent change in the drying property of the good solvent. In addition to this, it is considered that the interaction between the insulating particles and the water-insoluble polymer is involved in the porous skeleton formation, thereby contributing to the suppression of the formation of the skin layer. Further, it is considered that the fact that the presence ratio of the water-insoluble polymer in the coating film decreases due to the presence of the insulating particles and thus the segregation of the water-insoluble polymer in the surface layer portion of the coating film is suppressed also contributes to the suppression of the formation of the skin layer.

As described above, a resin porous body can be obtained. Since the formation of the skin layer is suppressed, the resin porous body has a three-dimensional network porous structure in which pores communicate from one main surface to the other main surface.

In the present disclosure, since the coating liquid contains insulating particles, the porosity of the obtained porous body becomes high. This is conceivably because the insulating particles serve as nuclei for phase separation, and the phase separation is thus promoted. Further, the shape of the insulating particles, in particular, the aspect ratio of the insulating particles affects the porosity, which is considered to be due to the change in the number of points to be the nucleus of the phase separation in the case where the shape, particularly the aspect ratio, of the insulating particles is changed. The resin porous body obtained by the production method of the present disclosure may have a porosity of, for example, 40% or more (particularly 50% or more, even 60% or more, and even 70% or more), and 90% or less (particularly, less than 85%). The porosity can be calculated by using the true density and the apparent density according to a known method.

According to the present disclosure, it is possible to manufacture a resin porous body by the simple procedure of preparing, coating and drying a coating liquid containing a water-insoluble polymer and insulating particles. In the present disclosure, it is not necessary to carry out a cooling procedure so as to precipitate a molded body or a procedure of replacing a solvent, which was necessary in the prior art. Therefore, the method of producing a resin porous body of the present disclosure is excellent in terms of simplicity. In addition, formation of a skin layer in the surface layer portion of the resin porous body is suppressed. Thus, the resin porous body can be used in a wide variety of applications.

Examples of applications of the resin porous body include packing materials, construction materials, sound-absorbing materials, cleaning articles, cosmetic products, separation membranes, adsorbent materials, carriers for purification, catalyst carriers and culture carriers. In addition, by making use of a nature that an electrolyte solution can infiltrate into the resin porous body because there is no skin layer, the resin porous body can be used as a separator of a secondary battery. When the resin porous body is applied to a separator application, a separator can be directly formed on the active material layer, which is advantageous in terms of separator production.

Therefore, the production method described above can be applied as a method of producing an electrode-integrated separator of a secondary battery, the method including the steps of; preparing a coating liquid in which a water-insoluble polymer is dissolved and insulating particles are dispersed in a mixed solvent containing a good solvent for the water-insoluble polymer and a poor solvent for the water-insoluble polymer; coating the coating liquid on an active material layer of an electrode; and removing the mixed solvent from the coated coating liquid by vaporization, in which the poor solvent has a boiling point higher than a boiling point of the good solvent, and pores are formed by removing the mixed solvent by vaporization to obtain a porous body.

In cases where the electrode is a positive electrode, an active material layer (that is, a positive electrode active material layer) can contain a positive electrode active material. Lithium-transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like) and lithium-transition metal phosphate compounds (for example, $LiFePO_4$ and the like) can be given as examples of the positive electrode active material. The positive electrode active material layer can contain components other than the active material, such as an electrically conductive material, a binder and lithium phosphate. Carbon black such as acetylene black (AB) and other carbon materials (for example, graphite or the like) can be advantageously used as an electrically conductive material. For example, poly(vinylidene fluoride) (PVDF) or the like can be used as a binder.

In cases where the electrode is a negative electrode, an active material layer (that is, a negative electrode active material layer) can contain a negative electrode active material. Carbon materials such as graphite, hard carbon and soft carbon can be given as examples of the negative electrode active material. The negative electrode active material layer can contain components other than the active material, such as a binder or a thickening agent. For example, a styrene-butadiene rubber (SBR) or the like can be used as a binder. For example, carboxymethyl cellulose (CMC) or the like can be used as a thickening agent.

The active material layer is typically formed on a current collector. Examples of the current collector include an aluminum foil and a copper foil.

This method of producing an electrode-integrated separator of a secondary battery is particularly excellent in terms of being able to produce an electrode-integrated separator of a secondary battery in an extremely simple manner.

EXAMPLES

Explanations will now be given of examples relating to the present disclosure, but it is not intended that the present disclosure is limited to these examples.

Comparative Example 1

Into a sample bottle, 1 g of an ethylene-vinyl alcohol copolymer ("Eval L171B" available from Kuraray Co., Ltd.; ethylene content 27 mol %, hereinafter abbreviated to "EVOH") was weighed out. To this was added 5 mL of a mixed solvent containing water and n-propyl alcohol (nPA) in a volume ratio of 7:3 as a good solvent and 2.1 mL of γ-butyrolactone (GBL) as a poor solvent. The sample bottle was heated to 80° C. to 90° C. and stirred until EVOH was completely dissolved in these solvents to obtain a coating liquid in which EVOH was dissolved. The resulting coating liquid was then cooled to 25° C. This coating liquid was applied by casting on an aluminum plate as a substrate. At this time, the coating thickness was 100 μm. This was then placed in a hot air drying oven set at 120° C. and heated, thereby removing a good solvent and a poor solvent by vaporization. In this manner, a thin film was obtained on the aluminum plate.

Examples 1-12

Into a sample bottle, 1 g of an ethylene-vinyl alcohol copolymer ("Eval L171B" available from Kuraray Co., Ltd.; ethylene content 27 mol %, hereinafter abbreviated to "EVOH") was weighed out. To this was added 5 mL of a mixed solvent containing water and n-propyl alcohol (nPA) in a volume ratio of 7:3 as a good solvent and 2.1 mL of γ-butyrolactone (GBL) as a poor solvent. The sample bottle was heated to 80° C. to 90° C. and stirred until EVOH was completely dissolved in these solvents to obtain an EVOH solution. After the EVOH solution was cooled to 25° C., to the EVOH solution, insulating particles described in Table 1 were added in amounts shown in Table 1. The obtained mixture was stirred using a high-speed disperser homodisper at a rotational speed of 1000 rpm for 20 minutes to obtain a coating liquid in which EVOH was dissolved and the insulating particles were dispersed. The obtained coating liquid was applied by casting on an aluminum plate as a substrate. At this time, the coating thickness was 100 μm. This was then placed in a hot air drying oven set at 120° C. and heated, thereby removing a good solvent and a poor solvent by vaporization. In this manner, a thin film was obtained on the aluminum plate.

Evaluation by SEM Observation

Figure 2:
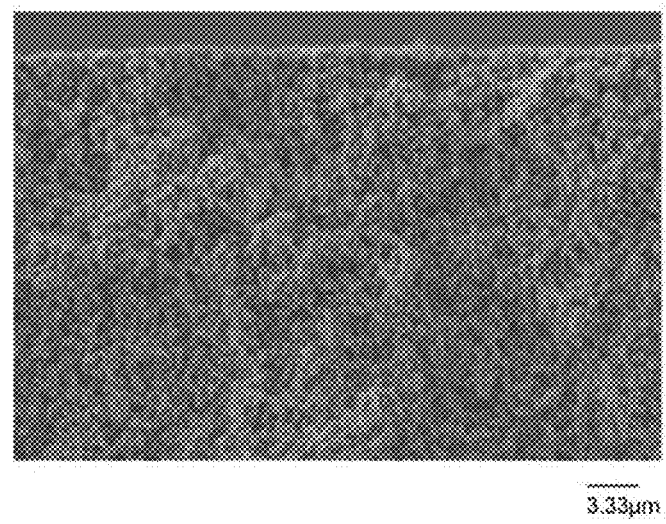
FIG. 2 is an SEM photograph of a cross section of the thin film obtained in Example 7.
Figure 3:
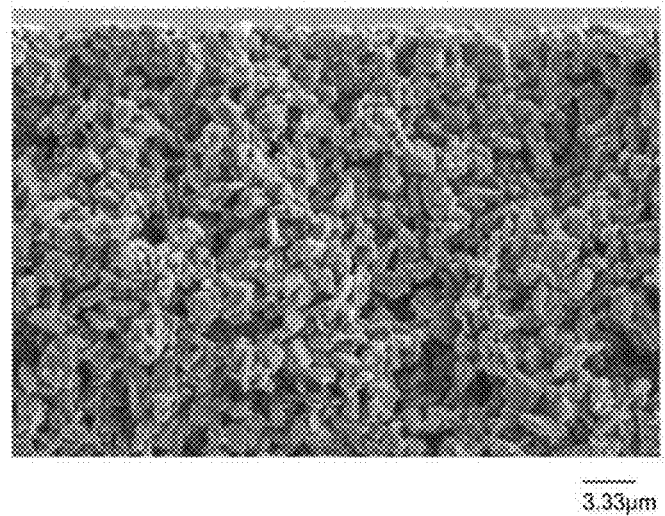
FIG. 3 is an SEM photograph of a cross section of the thin film obtained in Example 11.

For some of the Examples and the Comparative example, the cross-section of the obtained thin film was observed with a scanning electron microscope (SEM), and thereby it was confirmed that the thin film was porous. In addition, it was confirmed whether or not a skin layer was formed in the surface layer portion of the thin film. For reference, the SEM photograph of the cross section of the thin film obtained in Comparative Example 1 is shown in FIG. 1, the SEM photograph of the cross section of the thin film obtained in Example 7 is shown in FIG. 2, and the SEM photograph of the cross section of the thin film obtained in Example 11 is shown in FIG. 3. As shown in FIG. 1, although the thin film obtained in Comparative Example 1 is porous, it can be confirmed that a skin layer having no pores is formed on its surface layer portion. On the other hand, from FIG. 2 and FIG. 3, it can be seen that the thin films obtained in Example 7 and Example 11 also have pores in the surface layer portion and are porous as a whole.

Porosity Measurement

A sample was prepared by punching the thin films obtained in each of the Examples and Comparative Example into a predetermined size. The weight and film thickness of this sample were determined. From the area and the film thickness of the sample, the volume of the sample was determined, and the apparent density was calculated. The true density of the thin film was calculated from the true densities of the water-insoluble polymer and the insulating particles constituting the thin film and their content ratio. Using the apparent density and the true density, the porosity was calculated by the following formula. The results are given in Table 1.

Porosity (%)=(1−apparent density/true density)×100

Liquid Infiltration Evaluation

An organic solvent (ethanol or propylene carbonate) was added dropwise to the surface of the thin film obtained in each of the Examples and Comparative Example, and the state of penetration was evaluated visually. In cases where the organic solvent infiltrated as far as the back surface of the thin film, it could be assessed that there was no skin layer and that the thin film was porosified. However, in cases where the organic solvent did not infiltrate, it could be assessed that a skin layer was formed.

TABLE 1

|  | Insulating particles | | | | | | |
| --- | --- | --- | --- | --- | --- | --- | --- |
|  | Type | Shape | Average particle diameter (μm) | Aspect ratio | Addition Amount (g) | Porosity (%) | Skin Layer |
| Comparative Example 1 | None | — | — | — | 0 | 44.2 | Present |
| Example 1 | Boehmite | Needle-like | 3-6 | 40 | 1 | 65.2 | Absent |
| Example 2 |  |  |  |  | 4 | 75.5 | Absent |
| Example 3 |  | Scale-like | 2 | 40 | 1 | 66.8 | Absent |
| Example 4 |  |  |  |  | 4 | 77.3 | Absent |
| Example 5 |  |  | 5 | 20 | 1 | 64 | Absent |
| Example 6 |  |  |  |  | 4 | 78.2 | Absent |
| Example 7 |  | Cube-like | 0.7 | 2 | 4 | 41.9 | Absent |
| Example 8 |  |  | 2 | 2 | 4 | 42.8 | Absent |
| Example 9 |  | Plate-like | 3 | 10 | 1 | 58.2 | Absent |
| Example 10 |  |  |  |  | 4 | 63.4 | Absent |
| Example 11 |  |  | 1.7 | 10 | 4 | 51.6 | Absent |
| Example 12 | Alumina | Branched | 0.7 | — | 5 | 45.6 | Absent |

From the results shown in Table 1, it is understood that according to the present disclosure, a porous body of a water-insoluble polymer can be easily produced while suppressing formation of a skin layer.

What is claimed is:

1. A method of producing an electrode-integrated separator of a secondary battery, the method comprising the steps of:
    preparing a coating liquid in which a water-insoluble polymer is dissolved and insulating particles are dispersed in a mixed solvent containing a good solvent for the water-insoluble polymer and a poor solvent for the water-insoluble polymer;
    coating the coating liquid on an electrode; and
    removing the mixed solvent from the coated coating liquid by vaporization, wherein the poor solvent has a boiling point higher than a boiling point of the good solvent, and pores are formed by removing the mixed solvent by vaporization to obtain a porous body, wherein a content of the insulating particles in the coating liquid is 100 parts by mass or more and 700 parts by mass or less relative to 100 parts by mass of the water-insoluble polymer.

2. The production method according to claim 1, wherein the insulating particles are boehmite particles or alumina particles.

3. The production method according to claim 1, wherein the aspect ratio of the insulating particles is not less than 10 but not more than 40.

4. The production method according to claim 1, wherein the water-insoluble polymer is an ethylene-vinyl alcohol copolymer.

5. The production method according to claim 1, wherein the content of the insulating particles in the coating liquid is 400 parts by mass or more and 700 parts by mass or less relative to 100 parts by mass of the water-insoluble polymer.

6. The production method according to claim 1, wherein an average particle diameter of the insulating particles is 3 μm or more and 6 μm or less.

* * * * *